United States Patent Office 3,364,965
Patented Jan. 23, 1968

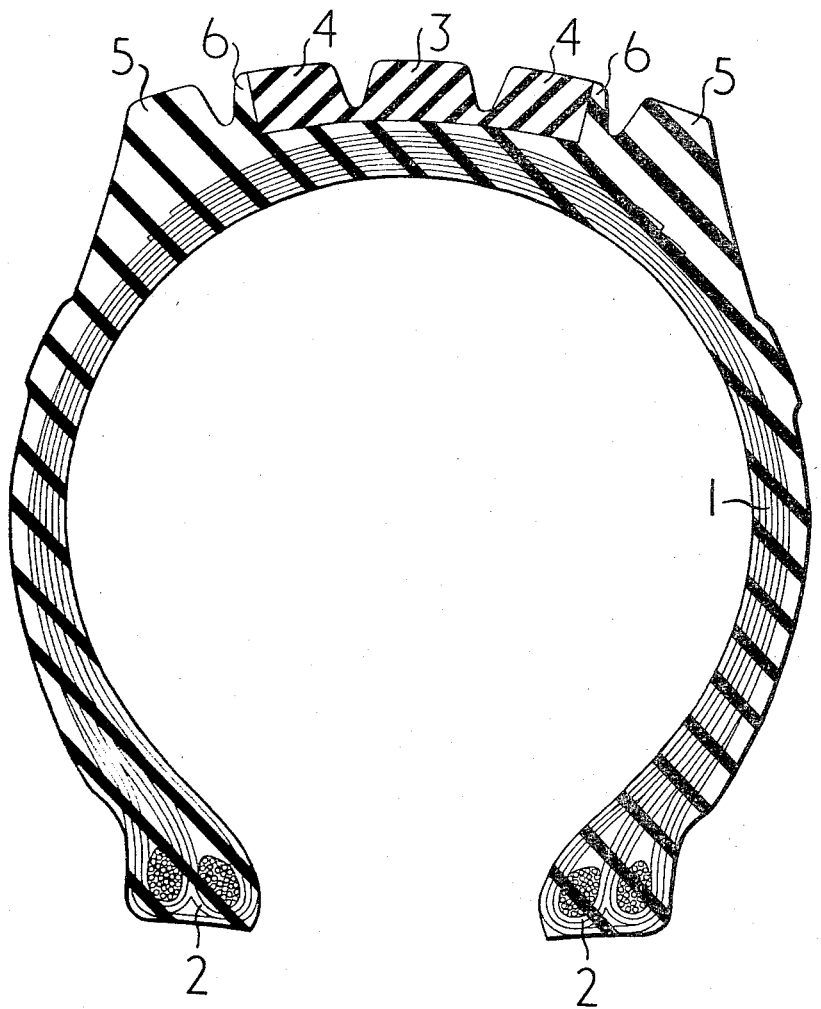

3,364,965
PNEUMATIC TIRE TREAD
Patrick S. Oubridge, Sutton Coldfield, England, assignor, by mesne assignments, to Dunlop Tire and Rubber Corporation, Buffalo, N.Y., a corporation of New York
Filed July 16, 1965, Ser. No. 472,602
Claims priority, application Great Britain, July 24, 1964, 29,784/64
4 Claims. (Cl. 152—209)

This invention relates to pneumatic tires, and more particularly, to oversized or giant pneumatic tires wherein the term giant tires is understood to refer or relate to tires of such size which are used upon the road wheels of large vehicles as distinguished from smaller size tires used on passenger vehicles and motorcycles and the like.

In conventional rubber-covered pneumatic tires, the tread regions were originally formed with natural rubber. To increase the road holding characteristics of tires, it is now considered desirable to replace the natural rubber of the treads with suitably selected synthetic rubbers which have higher coefficients of friction than natural rubber.

However, the use of these selected synthetic rubbers in the treads results in tire temperatures being attained, during use, which are higher than those attained in tires of similar size and construction but having treads formed from natural rubber. This is because the synthetic rubbers used in tire manufacture to give increased road holding usually have higher hysteresis loss than natural rubber. In the case of larger tire sizes, for instance as used upon lorries or omnibuses, and which have thicker treads than the smaller tires, the use of the selected synthetic rubbers in the treads results in tire temperatures being attained, during use, which have detrimental effects on the tires.

In consequence, the larger size tires are continued to be made with their treads formed from natural rubber, with the result that their road holding characteristics have not been improved in the manner in which these characteristics have been improved for the relatively smaller tire sizes incorporating synthetic rubber in their treads.

According to the invention, a pneumatic tire comprises a tread having an axially central tread region and two shoulder tread regions located axially one on each side of the central tread region, the rubber forming the tread surface in part at least of the central tread region having a higher coefficient of friction than and being of substantially the same hardness as the rubber forming the tread surface in part at least of the shoulder tread regions.

The term "coefficient of friction" as used herein and throughout this specification will be understood to mean the coefficient of friction which is obtained between the rubber forming the whole of the tread surface of a tire, when mounted upon a vehicle wheel, and a water-wet surface with which the tire is in contact when the wheel is braked, either in a locked or slipping condition relative to said surface, the braked slippage being slippage to give maximum friction as measured, for example, by a decelerometer installed in the vehicle, the wheel travelling in a straight line and the vehicle speed lying within the range of 15 m.p.h. to 50 m.p.h. Further the term "higher coefficient of friction" will be understood to mean a comparison between the coefficient of friction which is obtained, in a first test, under the above-defined conditions, between that type of rubber which forms the said part at least of the central tread region, if the whole of the tread surface was formed of such rubber, and said water-wet surface, and that coefficient of friction which is obtained, in a second test, under the same above-defined conditions, between that type of rubber which forms the said part at least of the shoulder tread regions, if the whole of the tread surface was formed of such rubber, and the same water-wet surface, the speeds of movement of the two rubbers relative to said surface being substantially equal, the vehicle speeds being substantially equal and the temperatures at the rubbing surfaces of the two rubbers being substantially equal in the two tests.

Preferably, the rubber forming the tread surface in the whole of the central region has a higher coefficient of friction than the rubber forming the tread surface in part at least of the shoulder regions.

Preferably, also, the tread surface is formed with a plurality of grooves extending generally circumferentially of said surface in the central tread region and the shoulder tread regions and the rubber having the higher coefficient of friction extends from the surface of the tread to the bases of the grooves in the central tread region.

The rubber forming the tread surface of the shoulder tread regions may be natural rubber, whilst the rubber forming the tread surface of the central tread region may be a synthetic rubber composition, preferably a composition containing a copolymer of butadiene and styrene.

One embodiment of a pneumatic tire constructed in accordance with the invention will now be described in more detail with reference to the accompanying drawing which shows a tire in transverse cross-section.

A "giant" open-bellied pneumatic tire for fitting to a 20-inch diameter wheel rim comprises a carcass reinforcement comprising a plurality of layers 1 of parallel nylon cord which extend from one bead region 2 of the tire to the other, the cords extending across the mid-circumferential plane at an angle of substantially 38° with the cords in adjacent layers being disposed in the opposite sense with respect to said plane.

The carcass reinforcement is surmounted by a rubber tread comprising five annular ribs, consisting of a central rib 3 extending around the tire and, symmetrically located with respect to the mid-circumferential plane of the tire, two intermediate ribs 4 located one axially on each side of and immediately adjacent the central rib, and two shoulder ribs 5 located one on each shoulder of the tire.

The central rib 3 and each intermediate rib 4, except for a relatively narrow radially extending strip 6 at the axially outer edge of each intermediate rib 4, is formed from a synthetic rubber composition containing a copolymer of butadiene and styrene with a styrene content of 36% compounded as follows:

| | Parts by weight |
|---|---|
| Butadiene/styrene copolymer | 69 |
| Extender oil | 21 |
| Natural rubber | 10.0 |
| Sulphur | 1.0 |
| Cyclohexylbenzthiazyl sulphenamide | 1.2 |
| 4-isopropylamino diphenylamine | 3.0 |
| Plasticizer—commercially available under the trade name Dutrex RT | 7.0 |
| Mineral oil | .05 |
| Stearic acid | 1.0 |
| Zinc oxide | 3.0 |
| Super abrasion furnace black | 60.0 |

The two shoulder ribs 5 and the relatively narrow strips 6 in the intermediate ribs 4 are formed from natural rubber.

The synthetic rubber of the tread has a higher coefficient of friction than the natural rubber in the shoulder regions when the temperatures of the tread surfaces of the two rubbers are equal and lie within the normal range of operating temperatures of the tire.

The road-holding characteristics of two tires having synthetic/natural rubber treads as described above were compared with those of two conventional tires of similar construction and size to the synthetic/natural rubber tread tires, except that the treads of the conventional tires were formed completely from natural rubber.

To make this comparison two tests were made as follows:

Test 1

A vehicle of 9 tons weight was initially fitted on its front wheels with the two synthetic/natural rubber tread tires, having inflationary pressures of 85 pounds per square inch. After the brakes to the rear wheels of the vehicle were rendered ineffective, the stopping distances of the vehicle were then measured on a wet smooth asphalt road when the vehicle was travelling at speeds of 25 to 30 m.p.h. by applying the front wheel brakes only. These distances were then measured for the same vehicle when fitted on its front wheels with the conventional tires having inflationary pressures of 85 pounds per square inch and travelling over the same stretch of road.

The results of the first test are as follows:

|  | Stopping Distance of vehicle using— | |
| --- | --- | --- |
|  | Synthetic/ natural rubber tread tires | Conventional tires |
| Speed at braking of vehicle: |  |  |
| 25 m.p.h | 101 feet | 137 feet. |
| 30 m.p.h | 172 feet | 259 feet. |

Test 2

The same vehicle used for Test 1 and equipped on its rear wheels with the synthetic/natural rubber tread tires was then driven along a wet smooth asphalt road built with a curvature having a radius of 150 feet, to determine the maximum speed at which the vehicle would travel before the tires commenced to slide on the road surface, i.e., when sideways sliding movement or "breakaway" of the rear end of the vehicle commenced. The speed at which complete "breakaway" occurred, i.e., when the tires ceased completely to grip the road surface, was also measured. These speeds were then determined under the same conditions and on the same stretch of road for the vehicle fitted on its rear wheels with the conventional tires.

The results of this test are as follows:

|  | Vehicle using— | |
| --- | --- | --- |
|  | Synthetic/ natural rubber tread tires | Conventional tires |
| Maximum speed before breakaway | 17 m.p.h | 17 m.p.h. |
| Speed at complete breakaway | 27 m.p.h | 23 m.p.h. |

Upon comparing the results obtained in these two tests, it is clear from Test 1 that when braking was applied at vehicle speeds of 25 to 30 m.p.h., the vehicle equipped with synthetic/natural rubber tires was stopped, respectively, within distances which were 74% and 66.5% of the distances within which it was stopped when equipped with conventional tires. Further, Test 2 indicates that, although the vehicle equipped with both types of tires had a maximum speed of 17 m.p.h. before breakaway occurred, when fitted with the synthetic/natural rubber tread tires, complete breakaway of the vehicle occurred at a speed which was 17.4% in excess of the speed of complete breakaway of the vehicle fitted with conventional tires.

The figures of the above tests indicate that there was less slippage of the synthetic/natural rubber tread tires upon the road surface than with the conventional tires.

It is apparent, therefore, that the use of the synthetic rubber in the central and intermediate ribs of the tire described in the embodiment causes the tire to have better road holding characteristics than are obtainable with conventional tires of similar size and construction.

In addition to making the comparison of road-holding characteristics, a third test was made to compare the running temperatures in the tread rubbers of the synthetic/ natural rubber tread tire described above and of a conventional tire of similar size and construction and having a tread formed completely from natural rubber.

Test 3

The synthetic/natural rubber tread tire described above was freely rotatably mounted upon a spindle within a machine framework with the tread surface of the tire in driving engagement with a driving drum drivable by means of an electric motor. The drum was driven to rotate the tire at a constant peripheral speed of 30 m.p.h., and when the temperature within the tread rubber of the tire had reached equilibrium, the drum and tire were stopped to allow temperature measurements in the crown and shoulder regions of the tread to be taken. The whole procedure was then repeated for constant tire peripheral speeds of 40, 50 and 60 m.p.h.

The above equilibrium temperature measurements were then taken for conventional tire after being driven by the drum at the above peripheral speeds.

When a comparison between the equilibrium temperature measurements of the two tires was made, it was noted that for any given speed, the temperatures of the crown region and the shoulder regions of the synthetic/natural rubber tread tire did not differ significantly, respectively, from those of the crown and shoulder regions of the conventional tire.

Having now described my invention, what I claim is:

1. A pneumatic tire comprising a tread having an axially central tread region formed of a synthetic rubber composition and two marginal ground-contacting tread-shoulder regions each comprising at least one rib formed of natural rubber located axially one on each side of said central tread region, the said synthetic rubber composition forming the tread surface in said central tread region having a high coefficient of friction and substantially the same hardness as the said natural rubber forming the tread surface in said marginal ground-contacting tread-shoulder regions.

2. A pneumatic tire as claimed in claim 1 wherein the tread surface is formed with a plurality of grooves extending generally circumferentially of said surface in said central and marginal ground-contacting tread-shoulder regions each comprising at least one rib and the said synthetic rubber composition extends from the surface of said central tread region to the bases of the grooves in said region.

3. A pneumatic tire as claimed in claim 2 wherein each interface between the central tread region and the marginal ground-contacting tread-shoulder region is spaced away axially from a groove.

4. A pneumatic tire as claimed in claim 1 wherein said synthetic rubber composition contains a copolymer of butadiene and styrene.

References Cited

UNITED STATES PATENTS

| 2,130,524 | 9/1938 | Clark | 152—211 |
| 3,230,998 | 1/1966 | Del Cegno | 152—176 X |
| 2,985,214 | 5/1961 | Lugli | 152—176 |
| 3,018,812 | 1/1962 | Haxo et al. | 152—330 |
| 3,157,218 | 11/1964 | Brown | 152—330 |

FOREIGN PATENTS

| 357,419 | 9/1931 | Great Britain. |

ARTHUR L. LA POINT, *Primary Examiner.*

C. W. HAEFELE, Y. P. SCHAEVITZ,
*Assistant Examiners.*